United States Patent [19]

Fujiki et al.

[11] Patent Number: 5,013,772
[45] Date of Patent: May 7, 1991

[54] METHOD FOR THE PREPARATION OF SILICONE RUBBER COMPOSITION

[75] Inventors: Hironao Fujiki, Takasaki; Morio Oohashi, Annaka, both of Japan

[73] Assignee: Shin-Etsu Chemical Co., Ltd., Tokyo, Japan

[21] Appl. No.: 387,600

[22] Filed: Jul. 28, 1989

[30] Foreign Application Priority Data

Aug. 23, 1988 [JP] Japan ................. 63-208889

[51] Int. Cl.$^5$ ................................. C08K 9/06
[52] U.S. Cl. ................... 523/213; 523/209; 523/212; 528/15
[58] Field of Search ............ 523/209, 212, 213

[56] References Cited
U.S. PATENT DOCUMENTS 4,427,801 1/1984 Sweet ........................ 524/862
4,764,577 8/1988 Inoue et al. .................. 528/32

Primary Examiner—Melvyn I. Marquis
Attorney, Agent, or Firm—Wyatt, Gerber, Burke and Badie

[57] ABSTRACT

A novel method is proposed for the preparation of a curable organopolysiloxane composition which is suitable as a material of a mold-making having excellent mechanical properties and durability in use for replica molding. The method comprises (a) blending a vinyl-containing organopolysiloxane with a hydrophobic reinforcing silica filler and hexamethyl disilazane, optionally, together with water each in a limited amount, (b) subjecting the blend to a heat treatment and (c) admixing the heat-treated blend with an organohydrogenpolysiloxane as a crosslinking agent of the vinyl-containing organopolysiloxane and a platinum compound as a catalyst for promoting the addition reaction between the silicon-bonded vinyl groups and the silicon-bonded hydrogen atoms.

15 Claims, No Drawings

METHOD FOR THE PREPARATION OF SILICONE RUBBER COMPOSITION

BACKGROUND OF THE INVENTION

The present invention relates to a method for the preparation of a silicone rubber composition or, more particularly, to a method for the preparation of an organopolysiloxane composition curable to give a cured silicone rubber body having good releasability from the surface of a mold on which the composition has been cured.

Several types of silicone rubber compositions have good releasability from the surface of a mold on which it has been cured so that such a silicone rubber composition is widely and traditionally used to prepare a matrix for mold-making of important historical or monumental materials and masterpieces of formative arts. In recent years, new applications of such silicone rubber compositions are under development in the manufacture of various kinds of industrial articles including parts and components of electric and electronic appliances, automobiles and other machines.

As a material used in the above mentioned mold-making for the industrial manufacture, it is essential that the silicone rubber-made matrix is capable of giving a large number of high-fidelity molded replicas sometimes having a very complicated configuration with high productivity and the molded replica has high mechanical strengths with long serviceable life. Also the silicone rubber-made matrix should have good handleableness and withstand the use in contact with certain synthetic resins which might cause degradation of the silicone rubber.

Various attempts have been made to meet the above mentioned requirements for the silicone rubber compositions used in mold-making. For example, Japanese Patent Publication No. 47-30422 teaches a method in which the silicone rubber composition comprises a hydrophobic silica filler having the surface blocked with triorganosiloxy groups of the unit formula $R_3SiO_{0.5}$, in which R is a monovalent hydrocarbon group, and an organopolysiloxane of which the molecular chain terminals are blocked each with a silanolic hydroxy group. Japanese Patent Publication No. 40-19178 teaches a method in which the silicone rubber composition comprises a reinforcing filler, an organopolysiloxane having silicon-bonded vinyl groups at the molecular chain terminals and a nitrogen-containing organosilicon compound. The silicone rubber compositions obtained by these methods are not always quite satisfactory as a material for mold making in respect of the surface releasability and durability.

In order to comply with the requirements for such a silicone rubber compositions used in mold-making of complicated and exquisite articles such as high tensile strength, ultimate elongation and tear strength, it is proposed that a base silicone rubber composition of the so-called addition-curable type comprising a vinyl-containing organopolysiloxane, organohydrogenpolysiloxane and platinum catalyst is further admixed with a resinous organopolysiloxane such as so-called MQ, MTQ, MDQ and MDTQ resins consisting of a combination of the monofunctional or M units of the formula $R_3SiO_{0.5}$, tetra-functional or Q units of the formula $SiO_2$, trifunctional or T units of the formula $RSiO_{1.5}$ and/or difunctional or D units of the formula $R_2SiO$, in which R is typically a monovalent hydrocarbon group.

The cured silicone rubber body prepared from such a silicone rubber composition, however, is deficient in the poor tear strength so that the silicone rubber-made mold can hardly be used in the molding of a claviform article. Although the deficiency in the mechanical strengths can be remedied by admixing an increased amount of a reinforcing filler, this measure is accompanied by another disadvantage of a decrease in the surface releasability.

SUMMARY OF THE INVENTION

The present invention accordingly has an object to provide a novel and improved method for the preparation of an organopolysiloxane composition capable of giving a cured silicone rubber body freed from the above described problems and disadvantages in the prior art methods.

Thus, the method of the present invention for the preparation of a curable organopolysiloxane composition comprises the steps of:

(a) blending 100 parts by weight of a vinyl-containing organopolysiloxane having, in a molecule, at least two vinyl groups directly bonded to the silicon atoms, from 1 to 50 parts by weight of a finely divided silica filler having a hydrophobic surface and from 1 to 30 parts by weight of hexamethyl disilazane into a uniform blend;

(b) subjecting the uniform blend obtained in step (a) to a heat treatment; and (c) admixing the heat-treated blend with an organohydrogenpolysiloxane in an amount sufficient to provide from 0.4 to 4.0 moles of hydrogen atoms directly bonded to the silicon atoms per mole of the vinyl groups in the vinyl-containing organopolysiloxane and a catalytic amount of a platinum compound.

DETAILED DESCRIPTION OF THE PREFERRED EMBODIMENTS

In the following, detailed description is given on each of the steps in the inventive method as well as the materials used in the respective steps.

In step (a) of the inventive method, a vinyl-containing organopolysiloxane as the base ingredient of the composition is blended with a silica filler and hexamethyl disilazane to give a uniform blend. The vinyl-containing organopolysiloxane essentially has at least two vinyl groups bonded to the silicon atoms in a molecule. Though not particularly limitative, the organopolysiloxane is preferably a diorganopolysiloxane having a straightly linear molecular structure. The vinyl groups can be bonded to the silicon atoms at any positions in the molecular chain including the terminal silicon atoms and the silicon atoms at intermediate positions within the molecular chains. The organic groups other than the vinyl groups in the organopolysiloxane are each a substituted or unsubstituted monovalent hydrocarbon group free from aliphatic unsaturation selected from the class consisting of alkyl groups, e.g., methyl group, and aryl groups, e.g., phenyl group, as well as halogen-substituted ones. Typically, the organopolysiloxane is expressed by one of the formulas

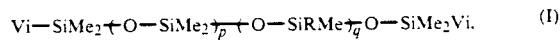

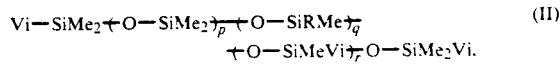

and

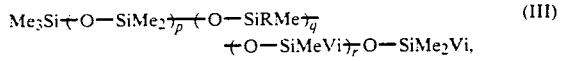

(III)

in which the subscript p is zero or a positive integer not exceeding 1200, the subscript q is zero or a positive integer not exceeding 200 with the proviso that p+q is in the range from 100 to 1200, the subscript r is a positive integer not exceeding 20, Vi is a vinyl group, Me is a methyl group and R denotes a fluorine-substituted alkyl group, e.g., 3,3,3-trifluoropropyl, 2-(perfluorobutyl)ethyl and 2-(perfluorooctyl)ethyl groups, or a fluorine-substituted polyether group such as those expressed by the formula

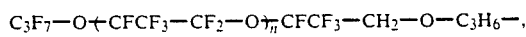

in which n is zero or a positive integer not exceeding 5.

The above described vinyl-containing organopolysiloxane is a well known material in the art of silicone rubbers. It is desirable that the organopolysiloxane has a viscosity in the range from 800 to 100,000 centipoise or, preferably, from 1,000 to 30,000 centipoise at 25° C. when the intended application of the composition is as a material for mold-making. When the organopolysiloxane has an average molecular weight so low as to have a viscosity lower than the above mentioned lower limit, the composition after curing has only insufficiently low mechanical properties. When the average molecular weight of the organopolysiloxane is so high that the viscosity thereof is higher than the above mentioned upper limit, on the other hand, the composition is hardly or poorly flowable to cause some inconveniences in the practical use of the composition for mold-making.

The above described organopolysiloxane is compounded in step (a) with a reinforcing silica filler having a specific surface area in the range from 50 to 800 m²/g or, preferably, from 100 to 400 m²/g by the BET method. Specifically, the reinforcing silica filler should have hydrophobicity on the surface. Such a hydrophobic silica filler is well known in the art and can be prepared by the treatment of an intrinsically hydrophilic silica filler, such as so-called fumed silica fillers, with an organosilicon compound such as dimethyl dichlorosilane, methyl trichlorosilane, hexamethyl disilazane and the like under heating so that the hydroxy groups on the surface of the silica particles are blocked with the organosiloxy groups of the formulas $(CH_3)_3SiO_{0.5}$, $(CH_3)_2SiO$ and $CH_3SiO_{1.5}$ or, preferably, $CH_3SiO_{1.5}$. Several commercial products of such a hydrophobic silica filler are available on the market and can be used as such in the inventive method. Examples of suitable commercial products include R-812, R-972 and R-976 (trade names, products by DEGUSSA Co., West Germany), HDK-H.15 and HDK-H.25 (trade names, products by Wackerchemie Co., West Germany) and the like. A hydrophobic silica filler is defined to be a silica filler which cannot be wetted with water or floats on the water surface when it is put into water. Since a hydrophobic silica filler always contains carbon as a result of the surface treatment to render the silica particles hydrophobic, the content of carbon can be a measure of the hydrophobicity. In this regard, the hydrophobic silica filler used in the inventive method should contain at least 0.5% or, preferably, at least 1.5% by weight of carbon. When the hydrophobicity of a commercially available reinforcing silica filler is insufficient, it is preferable that the hydrophobic silica filler as purchased is further treated with hexamethyl disilazane to increase the hydrophobicity before the filler is used in the inventive method.

The amount of the above described hydrophobic silica filler compounded with the vinyl-containing organopolysiloxane in step (a) of the inventive method is in the range from 1 to 50 parts by weight per 100 parts by weight of the vinyl-containing organopolysiloxane. When the amount of the silica filler is too small, the desired reinforcing effect cannot be fully obtained as a matter of course. When the amount thereof is too large, on the other hand, the composition obtained by the inventive method has a high consistency and is hardly or poorly flowable to cause some inconveniences in the practical use of the composition in mold-making. The amount of the filler can be somewhat decreased without affecting the mechanical strengths of the cured composition when the composition is further admixed with a suitable amount of a resinous silicone such as the so-called MQ, MTQ, MDQ and MDTQ resins.

It is essential in step (a) of the inventive method that the above described vinyl-containing organopolysiloxane and the hydrophobic reinforcing silica filler are compounded together in the presence of hexamethyl disilazane. Thus, the blend of the vinyl-containing organopolysiloxane and the hydrophobic silica filler under the compounding work in a suitable blending machine, such as a kneader, under heating is admixed with hexamethyl disilazane. It is presumable that the hexamethyl disilazane added to the blend is hydrolyzed in situ and reacts with the residual silanolic hydroxy groups on the surface of the hydrophobic silica filler so that the filler is imparted with further increased affinity with the organopolysiloxane to improve the flowability of the organopolysiloxane composition and the durable surface-releasability of the cured composition. Though not essential, it is sometimes advantageous that a small amount of water is added to the blend of the organopolysiloxane and the filler together with hexamethyl disilazane to promote hydrolysis thereof. It is noted that the desired effect obtained by the addition of hexamethyl disilazane is further improved by the combined use of a different disilazane compound such as 1,3-divinyl-1,1,3,3-tetramethyl disilazane or an alkoxy silane compound such as dimethyl dimethoxy silane.

The amount of hexamethyl disilazane added to the blend of the organopolysiloxane and hydrophobic filler is in the range from 1 to 30 parts by weight or, preferably, from 2 to 15 parts by weight per 100 parts by weight of the vinyl-containing organopolysiloxane. When the amount of hexamethyl disilazane is too small, the desired improvement in the flowability of the composition and the releasability of the cured composition cannot be obtained as a matter of course. On the other hand, the improving effect obtained by the addition thereof is no longer increased even by increasing the amount thereof to exceed the above mentioned upper limit rather with a problem due to ammonia produced by the hydrolysis of hexamethyl disilazane. The amount of water, when added, should not exceed 100% by weight or, preferably, should be in the range from 5 to 100% by weight of the amount of the hexamethyl disilazane.

The blend of the vinyl-containing organopolysiloxane, hydrophobic silica filler, hexamethyl disilazane and, optionally, water is subjected to a heat treatment or the blending work of these ingredients is performed with heating. The heat treatment is performed at a temperature in the range from 120° to 180° C. for 2 to 8 hours or, preferably, at a temperature in the range from 130° to 160° C. for 3 to 6 hours.

The thus heat-treated blend of the vinyl-containing organopolysiloxane, hydrophobic silica filler, hexamethyl disilazane and, optionally, water is admixed with an organohydrogenpolysiloxane and a platinum compound as a catalyst. The organohydrogenpolysiloxane, i.e. an organopolysiloxane having hydrogen atoms directly bonded to the silicon atoms, serves as a cross-linking agent of the vinyl-containing organopolysiloxane by the so-called hydrosilation reaction. In this regard, the organohydrogenpolysiloxane should have at least three silicon-bonded hydrogen atoms in a molecule. The average degree of polymerization thereof is preferably 300 or smaller. The amount of the organohydrogenpolysiloxane in the composition should be in such a range that from 0.4 to 4.0 moles of the silicon-bonded hydrogen atoms are provided per mole of the vinyl groups in the vinyl-containing organopolysiloxane.

The platinum compound added to the blend together with the organohydrogenpolysiloxane serves as a catalyst for promoting the addition reaction, i.e. hydrosilation reaction, between the vinyl groups in the vinyl-containing organopolysiloxane and the silicon-bonded hydrogen atoms in the organohydrogenpolysiloxane. Platinum compounds suitable for the purpose are well known in the art including chloroplatinic acid and complexes thereof with an alcohol, olefin or vinyl polysiloxane. Though not particularly limitative depending on the desired velocity of the curing reaction, the amount of the platinum compound added to the composition is usually in the range from 1 to 200 ppm by weight calculated as platinum relative to the amount of the vinyl-containing organopolysiloxane. An excessively large amount of the platinum compound gives no particular additional advantages rather with an economical disadvantage due to the high cost of the platinum compound.

The organopolysiloxane composition prepared in the above described manner according to the inventive method can further be admixed according to need with a pigment such as iron oxide, titanium dioxide, zinc oxide and the like as a coloring agent, an organopolysiloxane fluid or silicone oil having a viscosity higher than or lower than the vinyl-containing organopolysiloxane as the base ingredient of the composition with an object to further improve the surface releasability, and so on.

The organopolysiloxane composition obtained according to the inventive method can be cured to give a cured silicone rubber body which is used quite satisfactorily in mold-making of a matrix. For example, the cavity of a master mold is filled with the composition which is then heated at a temperature of, for example, 60° C. to effect curing. The cured organopolysiloxane composition has excellent mechanical properties including tensile strength, ultimate elongation at break and tear strength as well as excellent surface releasability with durability so that the matrix of the cured composition can be used for mold-making of various kinds of complicated and exquisite articles such as parts and components of electric and electronic appliances and automobiles.

In the following, the method of the present invention is described in more detail by way of examples and comparative examples, in which the term of "parts" always refers to "parts by weight" and the values of viscosity are all those obtained by the measurement at 25° C.

EXAMPLES AND COMPARATIVE EXAMPLES

Five curable organopolysiloxane compositions, referred to as the compositions I, II, III, IV and V hereinbelow, were prepared in Examples in the following manner. Thus, 100 parts of a dimethyl polysiloxane having a viscosity of 5000 centipoise and terminated at each molecular chain end with a vinyl dimethyl silyl group were admixed with 15 parts of a MDQ resin consisting of $(CH_3)_3SiO_{0.5}$ units, $SiO_2$ units and $(CH_2=CH)(CH_3)SiO$ units in such a proportion that the molar ratio of $(CH_3)_3SiO_{0.5}$ units to $SiO_2$ units was 0.8 and the content of the vinyl groups was 0.08 mole per 100 g (compositions I, II, III and IV only), 20 parts (compositions I, II, III and IV) or 25 parts (composition V) of a hydrophobic silica filler having a specific surface area of 200 $m^2/g$ shown below, 5 parts of hexamethyl disilazane and 2 parts of water (compositions I, II, III and V only) and the mixture was kneaded in a kneader at a temperature of 160° C. for 4 hours.

The hydrophobic silica filler used in the composition I was R-812 (supra), of which the surface-treatment agent was reportedly hexamethyl disilazane, and that used in the compositions II and IV was R-976, of which the surface-treatment agent was reportedly dimethyl dichlorosilane. The hydrophobic silica filler used in the compositions III and V was prepared by the treatment of a hydrophilic fumed silica filler (Rheolosil QS-30, a product by Tokuyama Soda Co.) with methyl trichlorosilane. These hydrophobic silica fillers contained about 2.0% by weight of carbon as determined using a carbon analyzer for metals.

Each of the thus prepared blend after cooling was admixed with 50 ppm by weight of chloroplatinic acid calculated as platinum based on the vinyl-containing dimethylpolysiloxane. In the next place, a 100 parts portion of the blend was admixed with 5 parts of a methyl hydrogen polysiloxane expressed by the formula

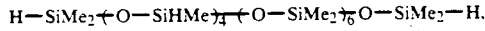

in which Me is a methyl group, and uniformly blended to give a curable organopolysiloxane composition.

For comparison, two more curable organopolysiloxane compositions, referred to as the compositions VI and VII hereinbelow, were prepared each in about the same manner as above. The formulation and procedure for the preparation of the composition VI were substantially the same as for the composition IV excepting omission of hexamethyl disilazane. The formulation and procedure for the preparation of the composition VII were substantially the same as for the compositions I and II excepting replacement of the hydrophobic silica filler with the same amount of the hydrophilic fumed silica filler (Aerosil 300, a product by Nippon Aerosil Co.) as such.

Table 1 below gives the viscosity of each of the compositions I to V and VII in poise at 25° C. The viscosity of the composition VI could not be determined due to the partly sagging consistency thereof. Each of the compositions was spread in a sheet-like form having a thickness of 2 mm and cured by standing as such at 25° C. for 24 hours into a cured silicone rubber sheet of which the mechanical properties were measured to give the results shown in Table 1.

The organopolysiloxane composition was poured into a master mold to fill the cavity thereof and cured therein by heating at 60° C. for 2 hours into a cured silicone rubber mold having a cavity for replica molding. In this test, the flowability of the compositions was evaluated in three ratings of A, B and C corresponding to excellent flowability to fill the cavity of the master mold without problems, somewhat poor flowability though pourable into the cavity and poor flowability not to be pourable into the cavity, respectively. The results are shown in Table 1.

The above prepared silicone rubber-made molds were repeatedly used 20 times or more in replica molding of an epoxy resin which was poured into the cavity of the mold and taken out thereof after curing to record the maximum number of the molded replicas having acceptable gloss on the surface using a single mold to give the results shown in Table 1. Further, the surface condition of the mold after the 20th molding was visually examined to give the results in three ratings of A, B and C corresponding to a smooth and crease-free surface, acceptable but a little creasy surface and cracked surface, respectively. The results are shown in Table 1.

TABLE 1

| Composition No. | I | II | III | IV | V | VI | VII |
|---|---|---|---|---|---|---|---|
| Viscosity, poise | 750 | 950 | 1000 | 1300 | 1500 | — | 700 |
| Flowability | A | A | A | B | B | C | A |
| Hardness, JIS A | 40 | 42 | 42 | 42 | 38 | 44 | 40 |
| Ultimate elongation, % | 370 | 350 | 350 | 350 | 450 | 300 | 400 |
| Tensile strength, kgf/cm² | 70 | 65 | 72 | 70 | 80 | 65 | 70 |
| Maximum number of replica molding | 18 | 21 | 22 | 18 | 22 | 10 | 14 |
| Surface of mold | A | A | A | A | A | C | B |

For further evaluation of the durability of the mold prepared from the inventive composition, several curable silicone compositions were prepared each in the same formulation as for the composition I described above excepting omission of hexamethyl disilazane or varying the amount of hexamethyl disilazane in the range from 1 to 10 parts. Molds were prepared from these compositions as well as the composition I and each used repeatedly for the replica molding of the epoxy resin to prepare replicas of the cured epoxy resin in the same manner as described above. The cured epoxy resin replica obtained by the 15th molding by using each mold was subjected to the measurement of the surface gloss according to the procedure specified in ASTM D 523 to find that the surface gloss was 10%, 50%, 66%, 88%, 90% and 89% when the amount of the hexamethyl disilazane added to the composition was 0 part, 1 part, 2 parts, 5 parts, 7.5 parts and 10 parts, respectively.

What is claimed is:
1. A method for the preparation of a curable organopolysiloxane composition which comprises the steps of:
   (a) blending 100 parts by weight of a vinyl-containing organopolysiloxane having, in a molecule, at least two vinyl groups directly bonded to the silicon atoms, from 1 to 50 parts by weight of a finely divided silica filler having a hydrophobic surface and from 1 to 30 parts by weight of hexamethyl disilazane into a uniform mixture:
   (b) subjecting the uniform mixture obtained in step (a) to a heat treatment at a temperature ranging from 120° C. to 180° C. for a length of time of at least 120 minutes; and
   (c) admixing the heat-treated mixture with an organohydrogenpolysiloxane in an amount sufficient to provide from 0.4 to 4.0 moles of hydrogen atoms directly bonded to the silicon atoms per mole of the vinyl groups in the vinyl-containing organopolysiloxane and a catalytic amount of a platinum compound.

2. The method for the preparation of a curable organopolysiloxane composition as claimed in claim 1 wherein the vinyl-containing organopolysiloxane has a viscosity in the range from 800 centipoise to 100,000 centipoiise at 25° C.

3. The method for the preparation of a curable organopolysiloxane composition as claimed in claim 1 wherein the finely divided silica filler has a specific surface area in the range from 50 m²/g to 400 m²/g.

4. The method for the preparation of a curable organopolysiloxane composition as claimed in claim 1 wherein the heat treatment in step (b) is performed at a temperature in the range of from 130° C. to 160° C. for a length of time of 3 to 6 hours.

5. The method for the preparation of a curable organopolysiloxane composition as claimed in claim 1 wherein the uniform mixture obtained in step (a) is further admixed with water in an amount not exceeding 100% by weight based on the amount of the hexamethyl disilazane.

6. The method for the preparation of a curable organopolysiloxane composition as claimed in claim 1 wherein the organohydrogenpolysiloxane has an average degree of polymerization not exceeding 300.

7. The method for the preparation of a curable organopolysiloxane composition as claimed in claim 1 wherein the vinyl-containing organopolysiloxane is a dimethyl polysiloxane terminated at each molecular chain end with a vinyl dimethyl silyl group.

8. The method for the preparation of a curable organopolysiloxane composition as claimed in claim 1 wherein the organohydrogenpolysiloxane is a methyl hydrogen polysiloxane.

9. The method for the preparation of a curable organopolysiloxane composition as claimed in claim 1 wherein the platinum compound is selected from the group consisting of chloroplatinic acid and complexes thereof with an alcohol, olefin or vinyl siloxane.

10. The method for the preparation of a curable organopolysiloxane composition as claimed in claim 1 wherein the amount of the platinum compound is in the range from 1 ppm to 200 ppm calculated as platinum based on the amount of the vinyl-containing organopolysiloxane.

11. The method for the preparation of a curable organopolysiloxane composition as claimed in claim 1 wherein the finely divided silica filler has a surface rendered hydrophobic as blocked with $(CH_3)_3SiO_{0.5}$ units.

12. The method for the preparation of a curable organopolysiloxane composition as claimed in claim 1 wherein the finely divided silica filler has a surface rendered hydrophobic as blocked with $(CH_3)_2SiO$ units.

13. The method for the preparation of a curable organopolysiloxane composition as claimed in claim 1 wherein the finely divided silica filler has a surface rendered hydrophobic as blocked with $(CH_3)_2SiO$ units and $CH_3SiO_{1.5}$ units in combination.

14. The method for the preparation of a curable organopolysiloxane composition as claimed in claim 1 wherein the finely divided silica filler has a surface rendered hydrophobic as blocked with $CH_3SiO_{1.5}$ units.

15. A cured organopolysiloxane composition obtained by curing the curable organopolysiloxane composition prepared according to the method of claim 1.

* * * * *